United States Patent
Grewal et al.

(10) Patent No.: US 11,328,040 B2
(45) Date of Patent: May 10, 2022

(54) MONITORING ACCESS

(71) Applicant: Hewlett-Packard Development Company, L.P., Spring, TX (US)

(72) Inventors: Gurchetan Grewal, Bristol (GB); David Plaquin, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 21 days.

(21) Appl. No.: 16/759,224

(22) PCT Filed: Oct. 30, 2017

(86) PCT No.: PCT/US2017/059101
§ 371 (c)(1),
(2) Date: Apr. 24, 2020

(87) PCT Pub. No.: WO2019/088981
PCT Pub. Date: May 9, 2019

(65) Prior Publication Data
US 2020/0334343 A1    Oct. 22, 2020

(51) Int. Cl.
*G06F 21/45*    (2013.01)
*G06F 21/31*    (2013.01)
*G06F 21/55*    (2013.01)
*H04L 29/06*    (2006.01)

(52) U.S. Cl.
CPC ............ *G06F 21/316* (2013.01); *G06F 21/45* (2013.01); *G06F 21/552* (2013.01); *H04L 63/0815* (2013.01)

(58) Field of Classification Search
CPC ...... G06F 21/316; G06F 21/45; G06F 21/552; H04L 63/0815
See application file for complete search history.

(56) References Cited

U.S. PATENT DOCUMENTS

| | | |
|---|---|---|
| 7,007,301 B2 | 2/2006 | Crosbie |
| 7,426,512 B1 | 9/2008 | Ben-Natan |
| 8,327,442 B2 | 12/2012 | Herz |
| 8,776,190 B1 * | 7/2014 | Gavage .................. G06F 21/33 726/5 |
| 8,938,613 B2 | 1/2015 | Burch |
| 2006/0294021 A1 | 12/2006 | Masuda |
| 2007/0174454 A1 | 7/2007 | Mitchell |

(Continued)

FOREIGN PATENT DOCUMENTS

| | | |
|---|---|---|
| GB | 2504402 B | 1/2014 |
| WO | WO-2016174261 A1 | 11/2016 |

OTHER PUBLICATIONS

Achieve HIPAA Compliance with Eventlog Analyzer, 2016, https://www.manageengine.com/products/eventlog/hipaa-compliance-reports.html.

*Primary Examiner* — Nelson S. Giddins
(74) *Attorney, Agent, or Firm* — HP Inc. Patent Department

(57) ABSTRACT

A method for monitoring access to a user account comprises receiving a user account login status from a target service in response to a user login request, comparing the user account login status with an expected status value at a user apparatus, and on the basis of the comparison, performing at least one of: synchronising the status value at the user apparatus with the user account login status from the target service, and executing a user login update process at the user apparatus.

14 Claims, 5 Drawing Sheets

(56) References Cited

U.S. PATENT DOCUMENTS

2011/0208965 A1* 8/2011 Machani ............. H04L 63/0435
713/168
2016/0173501 A1 6/2016 Brown
2018/0288066 A1* 10/2018 Brockhuus ............ H04W 12/08

\* cited by examiner

MONITORING ACCESS

BACKGROUND

User authentication is used in access controlled systems as a mechanism to provide information for the system to enforce access to resources and data to authorized users. The use of weak credentials and various attacks to steal user credentials have made current authentication methods unreliable enough to give assurance to users that their resources are private and safe. As a result, service providers are increasingly using second factor authentication as a mechanism to mitigate the use of weak password. However, those systems still rely on some form of password to register and/or recover the security token used as second factor.

BRIEF DESCRIPTION OF THE DRAWINGS

Various features of certain examples will be apparent from the detailed description which follows, taken in conjunction with the accompanying drawings, which together illustrate, by way of example only, a number of features, and wherein.

DETAILED DESCRIPTION

Figure 1:
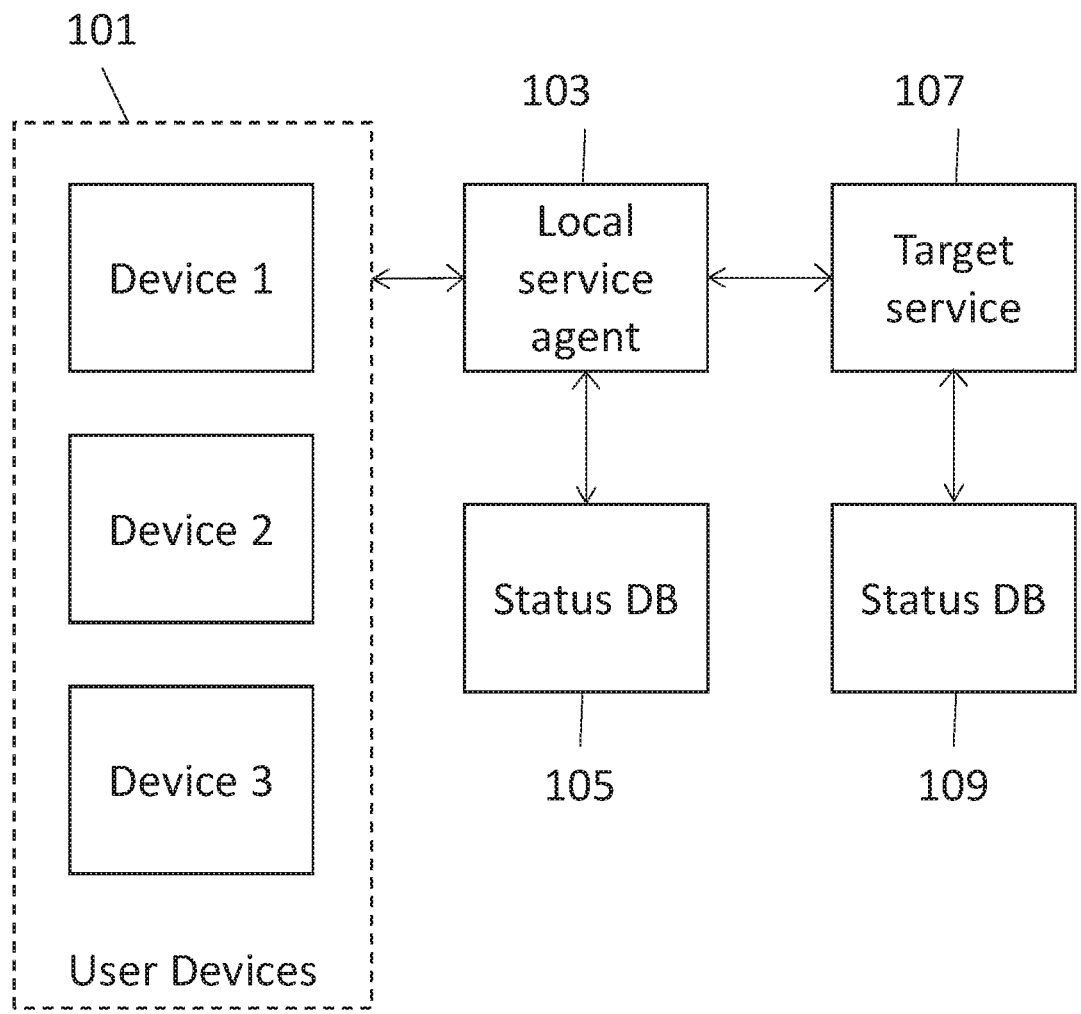
FIG. 1 is schematic representation of a system according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

According to an example, there is provided a method and system to make unauthorized access to user accounts evident to the user. A secure service that maintains a secure state related to the process of successful user logins is maintained, and can be used to report that state to the user on devices in a way that cannot be tampered with.

When a user's credentials are stolen by an attacker, the user has no reliable way of detecting this. Accordingly, an attacker can invade a user's privacy by logging into the user's account for a period of time without the user being aware, Users usually rely on a service provider to notify them of such unauthorised access, either as part of some auditing procedures, or when a large-scale breach has been detected (such as password database being stolen). However, as an example, if an attacker manages to steal a user's email account password then the attacker can read these emails for a long period of time without getting detected before the service provider itself becomes aware of the breach.

A service provider can use heuristics to detect unusual or suspect behaviour when a user is logging in, and either ask the user to go through extra authentication steps, or simply notify the user that unusual activity has occurred. This not only puts trust in the service provider, but often places the burden on the user to validate that the login attempt is a legitimate one. This can happen either due to a false positive stemming from the detection heuristics or because the user is provided with information that is too cumbersome to manage. For instance, some service providers give their users date and location (IP) information of the device from which their account was last successfully accessed. Some providers also keep a list of all login attempts and provide that to the user. This is a manual process and users have to voluntarily explore these logs and carefully detect any inconsistencies.

Other service providers report changes in login behaviour to the user by a different channel (such as by sending an email to their recovery email account). However, this process does not provide the user with a reliable method of detection since false positives make the user less likely to pay attention to those message, false negatives could miss a breach, and finally, should an attacker gain access to the user account he could delete such emails and thus bypass the notification mechanism altogether.

According to an example, unauthorized access to a user's account can be made evident using a secure service that includes a secure status of login attempts. The status can be reported to a local service agent.

FIG. 1 is schematic representation of a system according to an example. In the example of FIG. 1, a user has multiple devices 101 that the user owns and/or uses to access their accounts. Examples of user devices include a mobile phone, laptop, PC, tablet computer and so on.

In an example, a local service agent 103 is an agent that is present on all of the user's devices and is active when the user accesses their accounts. The agent 103 maintains a database that contains a synchronized login status, and it updates the status in a local database 105 that is synchronized between all devices 101 and which stores local login status values. In an example, the agent service can be provided remotely from user devices (but still distinct from the target service), and may be communicated with over a network such as the internet for example.

A target service 107 is a service that a user wishes to login to and use. In an example, the target service 107 performs the user authentication. The target service 107 maintains a secure status of the user login attempts. Each time a user authenticates with the target service 107, the secure status is updated.

The local status (i.e. the local database 105) is updated even if the target service 107 does not provide an update. Accordingly, in an example, the update is provided from the local service agent 103 since we do not want to trust the remote service 107 to send the proper notifications, and DB 109 is updated. In another example, the local service agent 103 can provide the authentication information to the target service 107 (for example, LSA 103 could be a service providing second factor authentication and log every usage of the token). Thus, according to an example, there is a synchronisation mechanism/protocol between LSA 103 and target service 107 that ensures both are involved in every user authentication operation. The status can be updated each time the user's account is accessed.

Figure 2:
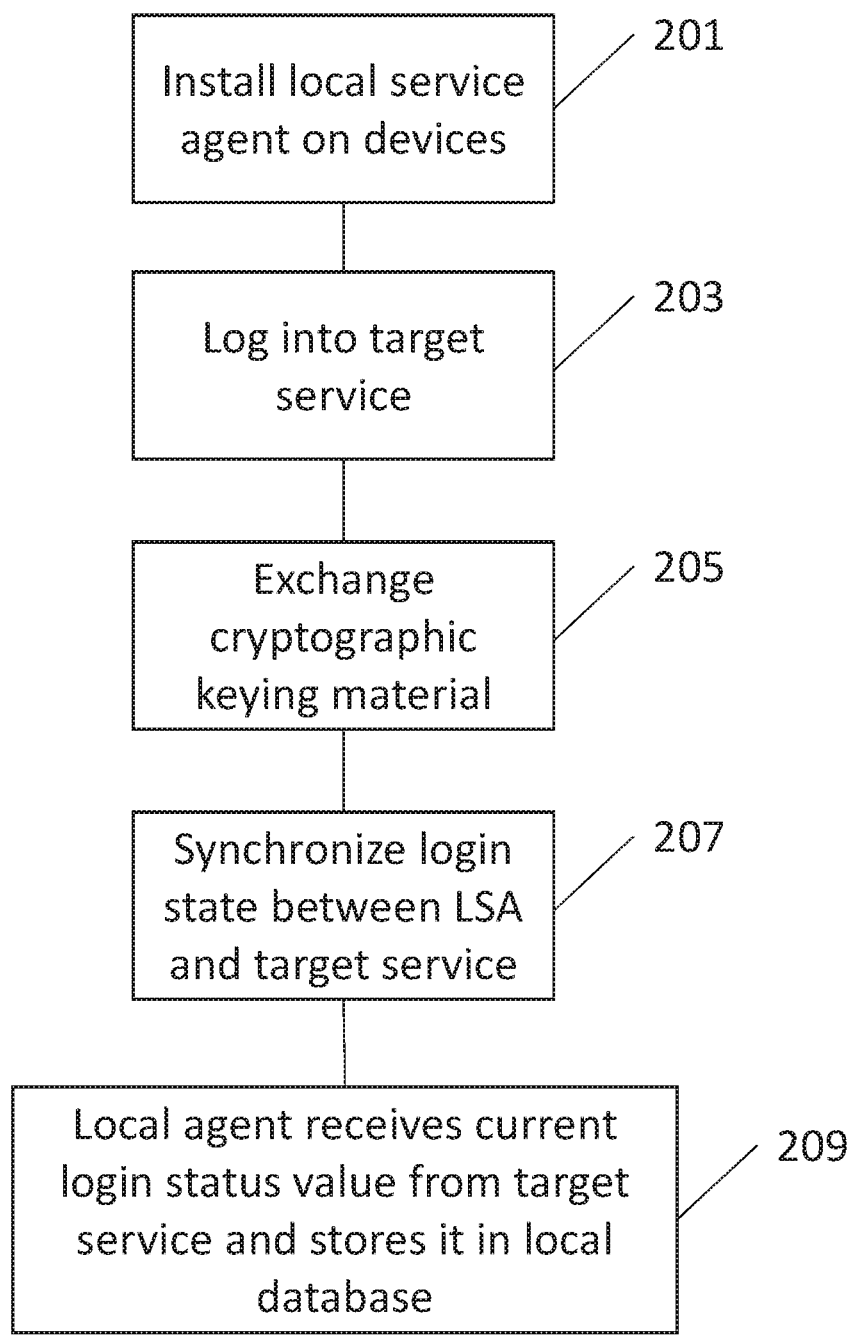
FIG. 2 is a flow chart of a method according to an example.

FIG. 2 is a flow chart of a method according to an example. Referring also to FIG. 1, in block 201, a user installs the local service agent 103 on all her devices 101 (if it is not pre-installed). In block 203, using each device, the user logs into the target service 107. In block 205, the target service 107 and the local service agent 103 exchange cryptographic keying material to establish an authenticated and encrypted communication channel. In an example, this can be done using a password based key derivation function that takes a user's password as input and creates a key that can be used to define an encrypted communication channel.

In block 207, the LSA 103 and the target service 107 synchronize the login state. In an example, in block 209, during the synchronization, the local agent 103 can receive a current login status value from the target service 107 and store it in its local database 105. According to an example, multiple target services can be registered and the LSA 103 can maintain login status of all the services. However, only one target service will be described herein. In some example, the user can select a login status range which is used by the secure service later during authentication.

In an example, the user devices 101 can create an authenticated and encrypted channel with each other. This could be done using Bluetooth, NFC or Wifi, and so on. Thus, in an example, whenever the devices 101 come into proximity or contact with each other they can provide the most recent and up to date login status value to each other over the authenticated and encrypted channel. Alternatively, devices can synchronise over a network such as the internet for example. So, it is effectively possible to synchronize whenever two or more devices are connected to a common medium (BT, Wifi, Internet).

Figure 3:
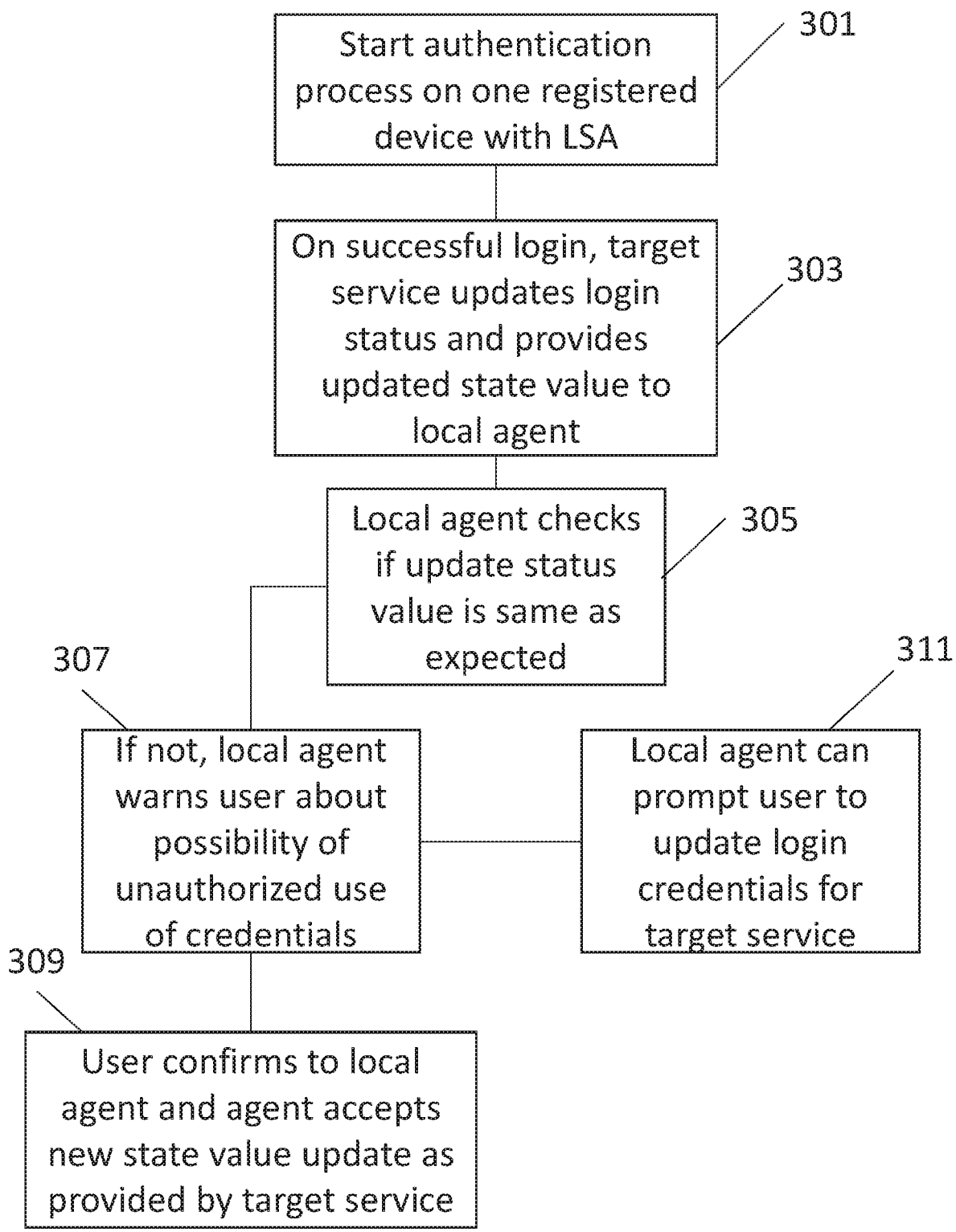
FIG. 3 is a flowchart of an authentication method according to an example.

FIG. 3 is a flowchart of an authentication method according to an example. In block 301, a user starts the authentication process on one of the registered devices 101 including the LSA 103. In block 303, on a successful login, the target service 107 updates the login status and provides the updated state value to local agent 103. Before updating the state on the local side, in block 305, the local agent 103 checks if the update state value is the same as it expected. If that is not the case, in block 307, the local agent warns the user about the possibility of an unauthorized use of their credentials. In some cases the user may have previously logged in to the target service 107 using an unregistered device. In that case, as shown in block 309, the user confirms this to the local agent and the local agent accepts the new state value update as provided by the target service. Otherwise, in block 311 the local agent can prompt the user to update their login credentials for the target service.

That is, in an example, if the user confirms that they have not accessed their account from an unregistered device then the update phase is triggered. The update stages redirect users to a change password page on the target service 107. The update phase also allows the user to add or remove personal devices with the Local service agent 103.

According to an example, counter values can be used as a login status values. For example, both a target service 107 and LSA 103 can maintain a counter database (105, 109). After every successful login attempt the target service 107 can increment the counter database 109. Similarly, LSA 103 counter 105 is incremented if a successful attempt is made using one if the registered devices 101.

At the time of authentication, the LSA 103 can take the counter value from the target service 107 (TS_count) and compare the value with its own local counter value (LSA_count).

For example, using a comparison function, f(TS_count, LSA_count, range), if TS_count>LSA_count, and TS_count−LSA_count=a value within the range then the function returns "OK" and the LSA value is incremented.

However, if TS_count>LSA_count, and TS_count−LSA_count=a value not within the range then the function can return "Possible evidence of password misuse", and user input is requested. For example, the user can be prompted to indicate whether they have logged into their account from a device that is not registered with LSA. If user response is YES, then the LSA_count can be updated to TS_Count. If user response is no, then a password change phase can be initiated as described above with reference to FIG. 3.

In an example, the range value can be 1. However, a user can specify a different value. As an example, if a user regularly logs into their account from a device where they do not have administration privileges and therefore cannot install an LSA, then instead of informing the LSA to update TS_Count frequently the user can chose a higher range value (e.g. 2 or 3 if they log into their account from a different device 2, 3 times before logging in from their own device).

As noted above, the comparison function compares the counter values. If the counter value is within the expected value range then the LSA 103 increments its local counter value. If there is a mismatch between the local and the target service's login counter then LSA agent warns the user. The alert message asks the user if their account was accessed from a device that is not registered with the LSA. If the user confirms that they have accessed the account from a different device, then the local counter is incremented else the user is taken to the change password or update stage.

In an example, instead of using a counter value, LSA 103 can track the IP addresses and browser information of all the user devices 101 and compare that with the login logs maintained and provided to the user by the target service 107. If the IP address and other log information does not match then the user is asked to review the information and possibly change their account password.

In another example, an Embedded Controller (EC) of a device 101 can be used to store counter values. For example, an EC can be used as a trusted component to store local counters and can act as an LSA. Alternatively, local counters can be stored on a smart device that the user trusts. The device, such as a smartphone for example, can communicate with a main user device 101, say a laptop, over Bluetooth or WiFi and so on to check the counter values.

In some examples, the target service login status value can be held in a public ledger like a blockchain. By using a blockchain to maintain the target service status value the target service does not need to be trusted to maintain the correct status database. A rogue target service or a rogue employee will not be able to access user's account without the user getting evidence of it. In an example, a status value can evolves as a user performs log ins over time. In some examples, the status value can be a hash of the blockchain.

Figure 4:
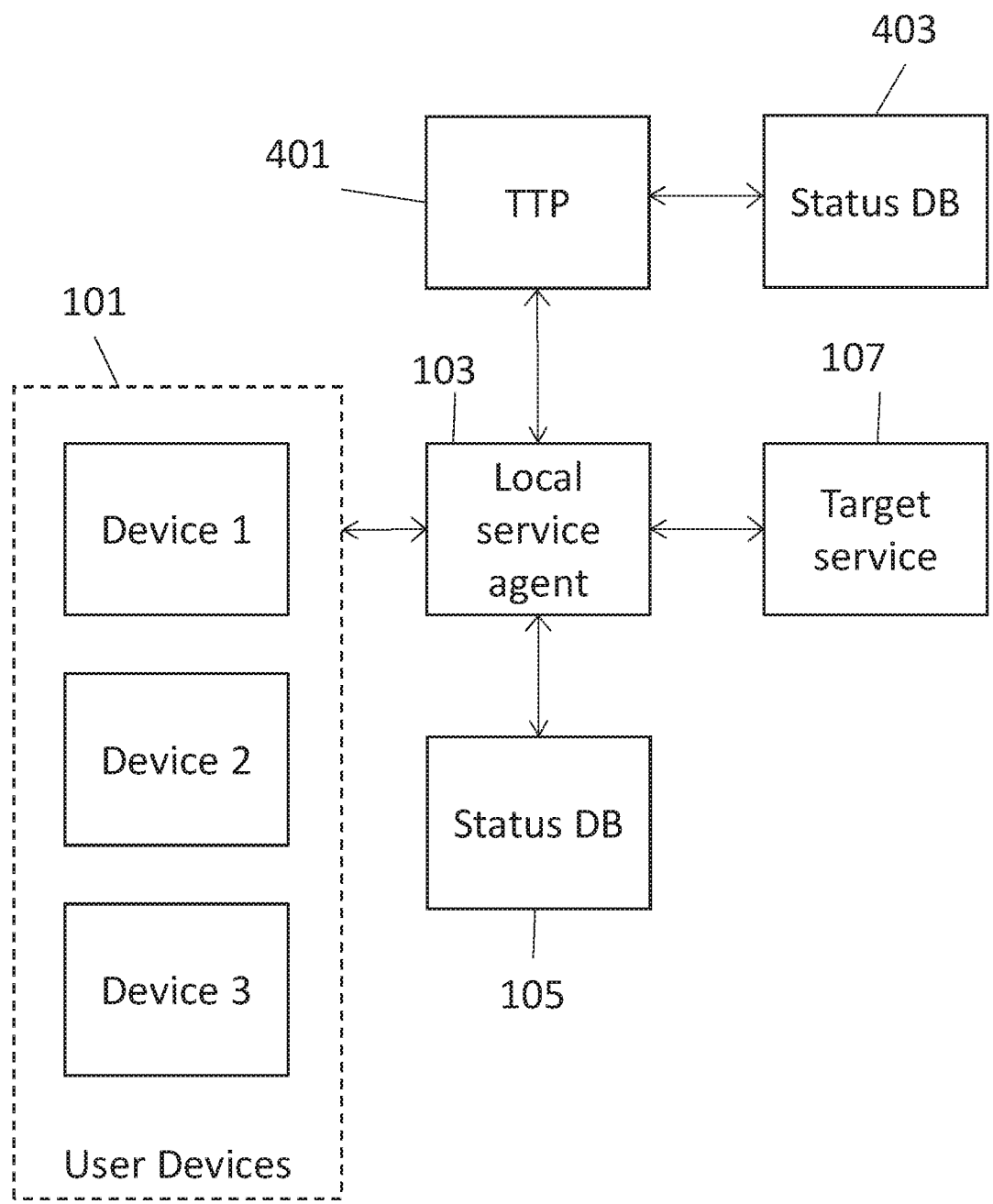
FIG. 4 is a schematic representation of a system according to an example.

FIG. 4 is a schematic representation of a system according to an example. In the example of FIG. 4, a trusted third party 401 can be used. That is, a user can authenticate to a trusted third party (TTP) 401 which maintains a login status database 403 (instead of the target service maintaining database 109). A user agent (e.g. a web browser) can authenticate the user on behalf of the TTP 401. If the authentication is successful, the TTP 401 can generate an ID token that encodes the user's identity. As an example, a JSON web token can be used as it supports a range of signatures and encryption processes. At the time of generating the ID token, the TTP 401 can update the user's login service status. The user, using the user agent, can provide the ID token to the website or another service where they want to log in to.

Therefore, in an example, the target service 107 can be split into two components: one component responsible for credential verification and which is trusted to update the status DB 105; and one component which is the target service itself 107 (i.e. the one which consumes the result of the authentication). In this way, the first components could be any service that can authenticate the user (either a Single Sign On service or a user password manager or a USB key).

Figure 5:
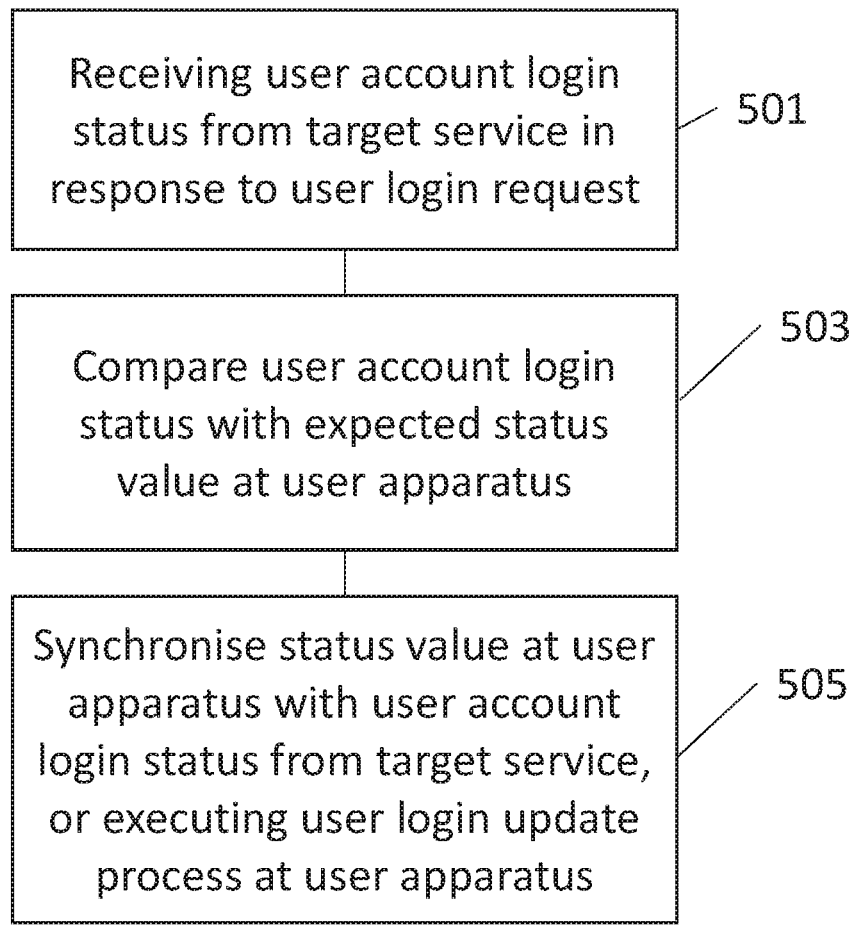
FIG. 5 is a flowchart of a method according to an example.

FIG. 5 is a flowchart of a method according to an example. In block 501, a user account login status is received from a target service in response to a user login request. In block 503, the user account login status is compared with an expected status value at a user apparatus. In block 505, on the basis of the comparison, performing at least one of: synchronising the status value at the user apparatus with the user account login status from the target service, and executing a user login update process at the user apparatus.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method for monitoring access to a user account, the method comprising:
   receiving a user account login status including a counter value from a target service in response to a user login request;
   comparing the user account login status with an expected status value including a corresponding counter value of a service agent of a user apparatus; and
   based on the comparison, performing at least one of:
      synchronising the status value at the user apparatus with the user account login status from the target service, or
      executing a user login update process at the user apparatus.

2. The method of claim 1, further comprising;
   exchanging cryptographic keying material between the target service and the service agent whereby to establish an authenticated and encrypted communication channel.

3. The method of claim 2, further comprising:
   synchronising the status value at the service agent of the user apparatus with the user account login status from the target service.

4. The method of claim 1, further comprising:
   updating the login status at the target service;
   providing the updated status value to the service;
   checking, using the service agent, whether the updated status value is the same as the expected status value.

5. The method of claim 1, further comprising registering the user apparatus using the service agent.

6. The method of claim 1, further comprising:
   determining whether the counter value from the target service is greater than the corresponding counter value of the service agent; and
   determining whether a difference between the counter value from the target service and the corresponding counter value of the service agent is within a threshold range.

7. The method of claim 6, further comprising: incrementing the corresponding counter value of the service agent.

8. A method for monitoring access to a user account, the method comprising:
   receiving a user account login status including a counter value from a target service in response to a user login request;
   determining a difference between the user account login status with an expected status value including a corresponding counter value of a service agent of a user apparatus; and
   based on the determined difference, executing a user login update process at the user apparatus.

9. The method of claim 8, further comprising:
   receiving cryptographic keying material from the target service whereby to establish an authenticated and encrypted communication channel.

10. The method of claim 8, wherein determining the difference includes:
    determining that the counter value from the target service is greater than the corresponding counter value of the service agent.

11. The method of claim 10, wherein determining the difference further includes:
    determining that the difference between the counter value from the target service and the counter value of the service agent is outside of a threshold range.

12. The method of claim 8, registering the user apparatus using the service agent.

13. The method of claim 8, wherein the corresponding counter value indicates successful logins at a plurality of registered user apparatuses.

14. The method of claim 8, further comprising:
    receiving a notification that an authorized user logged in with an unregistered user apparatus; and
    synchronizing the status value at the user apparatus with the user account login status from the target service.

* * * * *